United States Patent [19]

Sovis et al.

[11] Patent Number: 5,222,786
[45] Date of Patent: Jun. 29, 1993

[54] WHEEL CONSTRUCTION FOR VACUUM CLEANER

[75] Inventors: John F. Sovis, Twinsburg; Michael F. Wright, Cuyahoga Falls, both of Ohio

[73] Assignee: Royal Appliance Mfg. Co., Cleveland, Ohio

[21] Appl. No.: 818,614

[22] Filed: Jan. 10, 1992

[51] Int. Cl.$^5$ .................................... B60B 27/00
[52] U.S. Cl. ............................... 301/111; 301/122; 301/64.7
[58] Field of Search ............ 301/1, 63 PW, 111, 112, 301/119, 120, 121, 122, 124 R, 126, 131, 64.7, 124.1; 16/45, 46

[56] References Cited

U.S. PATENT DOCUMENTS

| | | |
|---|---|---|
| 1,401,900 | 12/1921 | Fisher . |
| 2,073,347 | 3/1937 | Leathers . |
| 2,175,646 | 10/1939 | Replogle . |
| 2,778,159 | 1/1957 | Irwin . |
| 3,813,054 | 5/1974 | Klingspor ................ 301/112 X |
| 3,888,545 | 6/1975 | Braun ...................... 301/63 PW |
| 3,907,370 | 9/1975 | Bard ..................... 301/63 PW X |
| 4,447,093 | 5/1984 | Conard et al. ............ 301/63 PW |
| 4,530,543 | 7/1985 | Keane . |
| 4,544,425 | 10/1985 | Provolo .................... 301/122 X |
| 4,546,512 | 10/1985 | Liebscher et al. . |
| 4,923,252 | 5/1990 | Plamper et al. ............. 301/63 PW |
| 4,955,669 | 9/1990 | Jankevics . |
| 4,979,262 | 12/1990 | Lautenschläger . |
| 5,014,392 | 5/1991 | Melara ...................... 301/122 X |

Primary Examiner—Russell D. Stormer
Attorney, Agent, or Firm—Fay, Sharpe, Beall, Fagan, Minnich & McKee

[57] ABSTRACT

A wheel assembly for a vacuum cleaner includes an axle, a collar, and a wheel. The axle is cylindrical and has inward and outward ends. The inward end is attached to a housing of an associated vacuum cleaner and the outward end has locking projections extending radially outwardly from an axial centerline. The collar has an outward end which includes collar gaps. When the axle is fitted within the collar, the locking projections fit into the collar gaps preventing rotational movement between the collar and the axle. The wheel has a wheel bore therethrough. When the wheel is fitted over the collar and axle, so that the collar and axle fit within the wheel bore, the locking projections snap radially outwardly against an outer surface of the wheel, thereby holding the wheel, collar, and axle together and permitting rotational movement between the wheel and the collar.

13 Claims, 2 Drawing Sheets

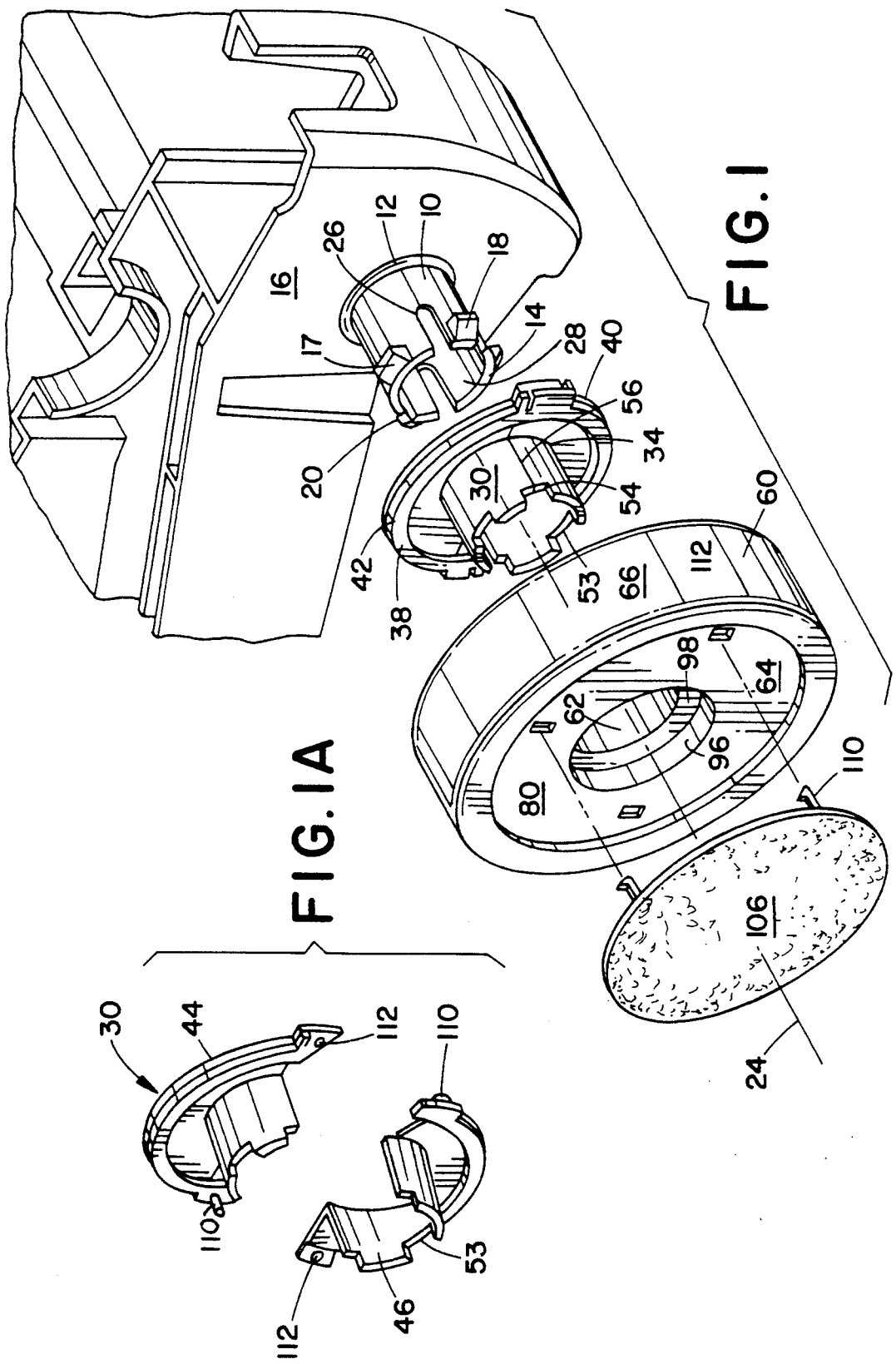

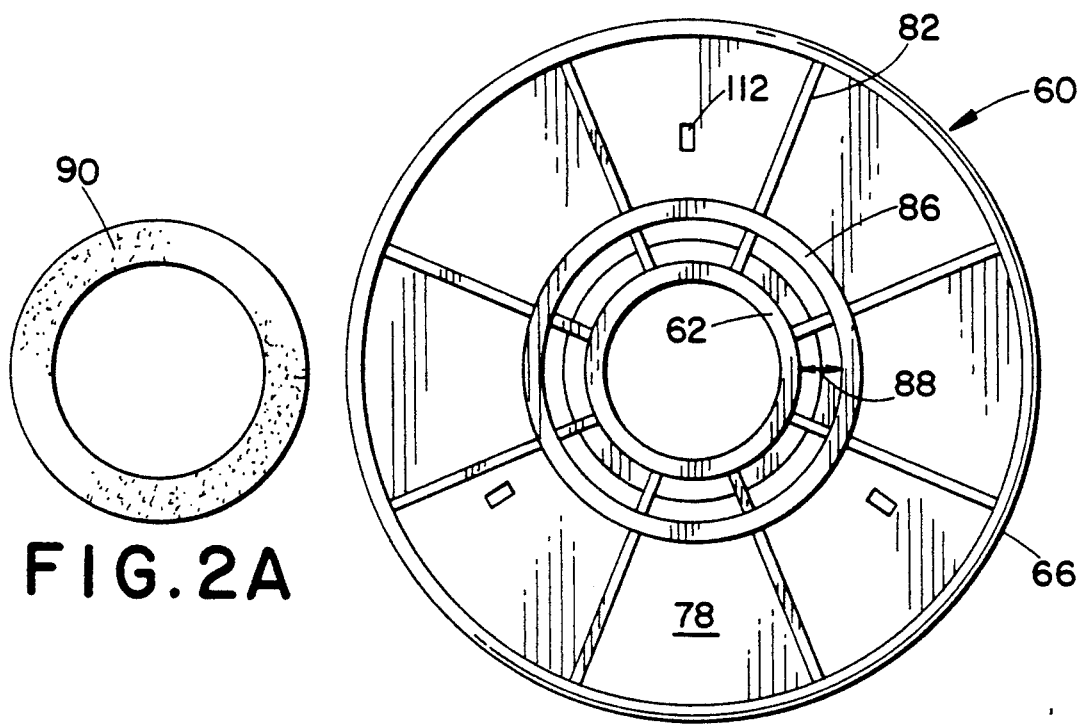
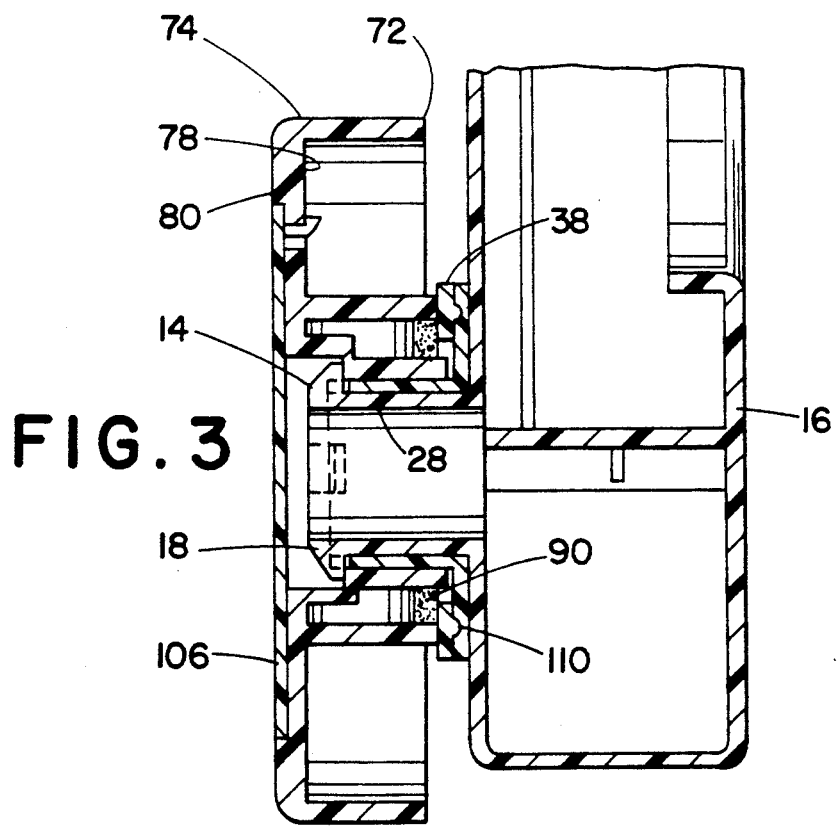

WHEEL CONSTRUCTION FOR VACUUM CLEANER

BACKGROUND OF THE INVENTION

1. Field of the Invention

This invention pertains to the field of floor care appliances and more specifically to a wheel construction for use with such floor care appliances.

2. Description of the Related Art

Vacuum cleaners are a common form of floor care appliance. Typically, vacuum cleaners are supported above the floor by four wheels, one each of such wheels being mounted at the corners of a vacuum cleaner housing by means of axles or spindles. To facilitate manufacture and to minimize cost, it has been conventional to manufacture such wheels from a plastic material An example of a plastic wheel for a vacuum cleaner is disclosed in U.S. Pat. No. 4,530,543 to Keane. In Keane, the wheel is made of plastic and has a fixed annular bearing surface. A resiliently deflectable latch element is used to secure the wheel to the housing of the vacuum cleaner. Another example is U.S. Pat. No. 2,778,159 to Irwin in which a wheel may be installed upon an axle by pressing the wheel onto the axle until a flanged portion of a hub snaps over a head of a button-like extension of the axle. U.S. Pat. No. 4,955,669 to Jankevics discloses a wheel bearing arrangement for a vacuum cleaner wherein the wheel has on its inside a shaft cooperating with bearing surfaces in the suction cleaner housing. Further, in U.S. Pat. No. 1,401,900 to Fisher a vehicle wheel spindle is disclosed wherein the vehicle spindle has a plurality of successively removable annular spacers or rings fitted upon a threaded nut receiving extension of the spindle. Finally, U.S. Pat. No. 4,546,512 to Liebsher discloses a non-motorized, mechanical sweeper with slot-like bearing bores with introduction slits in partition walls and outwardly open wheel recesses in the housing wherein drive wheels are closed externally with a smooth surface and are retained by check plates and retaining pockets on the partition walls.

Some of the foregoing designs are complex and expensive to manufacture. In others, the wheels begin to wobble on their spindles or axles after a short period of use. Applicants have developed a wheel construction which is inexpensive, yet very effective for its intended purpose.

Therefore, the present invention contemplates a new and improved wheel construction which is simple in design, effective in use, and overcomes the foregoing difficulties and others while providing better and more advantageous overall results.

SUMMARY OF THE INVENTION

In accordance with the present invention, a new and improved wheel construction is provided which supports a floor care appliance housing over the surface to be cleaned.

More particularly, in accordance with the invention, a wheel assembly for a vacuum cleaner comprises an axle, a collar, and a wheel. The axle is generally cylindrical and has an axle centerline and inward and outward ends. The inward end of the axle is fixedly attached to an associated vacuum cleaner. The outward end has a locking projection extending generally radially outwardly from the axle centerline. The locking projection has a locking surface which lies in a plane which is substantially perpendicular to the axle centerline. The collar is also generally cylindrical and has a collar bore extending therethrough. The collar also has inward and outward ends with the inward end comprising a collar flange. The wheel has a wheel bore extending therethrough. The axle fits within the collar bore and the collar fits within the wheel bore. The locking surface of the locking projection fits over the outward ends of the collar and the wheel to secure the wheel assembly together.

According to another aspect of the invention, the outward surface of the wheel further comprises a recessed wheel annulus adjacent to the wheel bore. The wheel annulus extends inwardly toward the inward surface of the wheel a distance less than a thickness of the wheel. The wheel annulus creates a wheel ledge which lies in a plane perpendicular to the axle centerline. The locking projection fits over the wheel ledge to secure the wheel assembly together.

According to another aspect of the invention, a wheel for a floor care appliance comprises a wheel sleeve, a tread surface, and an outward surface. The wheel sleeve is cylindrical and has a wheel bore therethrough. The tread surface is concentrically radially outwardly of the wheel sleeve and is connected thereto by a wheel disk. The wheel disk is generally planar and extends between an outward edge of the wheel sleeve and an outward edge of the tread surface.

One advantage of the present invention is the provision of a new wheel construction which supports a floor care appliance above the surface to be cleaned.

Another advantage of the invention is the provision of a low cost wheel construction.

Still another advantage of the invention is that the design facilitates the use of plastic parts. The design utilizes relatively large diameter axles allowing the rigidity to come from the shape of the structure rather than the material itself. Further, the design incorporates the resiliently deformable nature of plastic.

Yet another advantage of the invention is the ability to assemble the wheel construction without the need for conventional fasteners such as screws, bolts, or nuts. The elimination of such fasteners lowers costs in materials as well as assembly.

A further advantage of the invention is that this wheel construction does not wobble on its axle to the same extent as do the conventional wheel constructions.

Still other advantages of the invention will be apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 1 is an exploded perspective view of the inventive wheel construction;

FIG. 1A is an exploded perspective view of each half of a collar according to the invention;

FIG. 2 is a rear elevational view of an inward surface of a wheel according to the invention;

FIG. 2A is a rear elevational view of a felt washer used with the inventive wheel shown in FIG. 2; and, FIG. 3 is a cross-sectional view of the wheel construction of FIG. 1 in an assembled condition.

DETAILED DESCRIPTION OF THE PREFERRED EMBODIMENT

Referring now to the drawings wherein the showings are for purposes of illustrating a preferred embodiment of the invention only and not for purposes of limiting the same, FIG. 1 is an exploded perspective view of a wheel assembly according to the invention. Throughout the following description of the invention, the word "axially inwardly" will refer to a direction along an axial centerline of the wheel assembly toward the vacuum cleaner while the term "axially outwardly" will refer to a direction along the axial centerline of the wheel assembly away from the vacuum cleaner. Similarly, "radially inwardly" means toward the axial centerline and "radially outwardly" means away from the axial centerline. While the wheel construction is illustrated as being used on a vacuum cleaner, it should be appreciated that the construction could also be used for carpet sweepers or any other appliance which is adapted to roll on a support surface.

An axle or spindle 10 of the construction has an inward end 12 and an outward end 14. The inward end 12 is fixedly, non-rotatably, attached to the housing 16 of the vacuum cleaner. If desired, the axle 10 and housing 16 can be of one piece, such as by being injection molded together from a suitable thermoplastic material. The outward end 14 has a plurality of radially outwardly extending locking projections 17, 18. The locking projections 17, 18 have a locking surface 20 which is generally planar and which is preferably substantially perpendicular to an axial centerline 24 of the wheel assembly. Slots 26 extend axially inwardly from the outward end 14 of the axle 10. The slots 26 reduce the structural rigidity of the axle 10, facilitating the axially inward elastic deformation of the outward end 14 during assembly. The axle is tubular in shape and has a hollow interior as at 28.

A collar 30 is generally cylindrical and has a collar bore 32 therethrough. The collar 30 has an inward end 34 and an outward end 36. The inward end 34 comprises a collar flange 38. The collar flange 38 has an inward surface 40 and an outward surface 42. The outward end 36 of the collar 30 comprises a plurality of collar gaps 53, 54 defined between spaced extended collar sections 55. The collar gaps 53, 54 receive the locking projections 17, 18 of the axle 10 and thereby prevent rotation of the collar 30 relative to the axle 10.

As is most clearly seen in FIG. 1A, the collar 30 is longitudinally split into halves 44, 46 along a split line 56. The collar 30 is split into halves 44, 46 in order to assemble the collar 30 about the axle 10. The halves 44, 46 are joined together via bumps 110 and recesses 112.

The wheel 60 comprises a wheel sleeve 62, a wheel disk 64, and a tread surface 66. The wheel sleeve 62 is cylindrical and has a wheel bore 68 (FIG. 2) extending therethrough. The tread surface 66 is located concentrically radially outwardly of the wheel sleeve 62 and has an inward edge 72 and an outward edge 74 (FIG. 3).

The wheel disk 64 has an inward surface 78 (FIG. 2) and an outward surface 80. With particular reference to FIGS. 2 and 3, the inward surface 78 of the wheel disk 64 has a concave shape and is reinforced by a plurality of spaced ribs 82. A wheel ring 86 extends concentrically radially of the wheel sleeve 62 between the wheel sleeve and the tread surface 66, thereby forming wheel canal 88 therebetween. A felt washer 90 is received and retained within the wheel canal 88. Similarly, a collar canal 89 is formed into the outer surface 42 of the collar flange 38 of the collar 30. The felt washer 90 helps seal the area between the wheel 60 and the outer surface 42 of the collar flange 38 of the collar 30 as the wheel rotates in relation to the collar. Other type sealing means can be used although felt is presently preferred. Without such sealing means, rotation of the wheel could be impeded due to hair, dust, or other foreign materials. As mentioned, the collar 30 is fixed to the non-rotating axle 10 via locking projections 17, 18 which fit into collar gaps 53, 54. Collar gaps 53 are wider than collar gaps 54 to ensure that the collar 30 receives the axle 10 in such a way that the split line 56 is horizontal, as indicated in FIG. 1. Similarly, locking projections 17 are wider than locking projections 18, so that locking projections 17 are associated with collar gaps 53 and locking projections 18 are associated with collar gaps 54.

With reference again to FIG. 1, the outward surface 80 of the wheel disk 64 includes a recessed wheel annulus 96. The recessed wheel annulus 96 creates a wheel ledge 98 which extends radially inwardly toward the axial centerline 24.

The outward surface 80 of the wheel disk 64 also comprises a wheel cover recess 102 which is concentrically centered about the axial centerline and which is recessed axially inwardly a certain thickness. A wheel cover 106 is held within the wheel cover recess 102 and covers the wheel annulus 96. The wheel cover 106 can be snapped into place within the wheel cover recess 102 via hooks 110. The hooks 110 fit within holes 112 in the wheel disk 64. Alternatively, the wheel cover 106 can be adhesively secured to the wheel 60. The wheel cover 106 provides an attractive appearance for the wheel disk 64. It also protects locking projections 17, 18 from dust as they slide on the wheel ledge 98. Further, dust is prevented from accumulating in the axle interior 28.

During assembly, the halves 44, 46 of the collar 30 are fitted together around the axle 10.

Next, the wheel 60 is placed over the collar 30, so that the collar 30 is received within the wheel bore 68 of the wheel sleeve 62. The collar 30 is sized so that the fit is snug. When the wheel 60 is fully received onto the collar 30, the locking projections 17, 18 snap radially outwardly as shown in FIG. 3, extending over the wheel ledge 98, thereby locking said wheel 60 to the collar 30, axle 10, and vacuum cleaner housing 16. Alternatively, the collar 30 can be placed in the wheel sleeve 62 before these two components are snapped onto the axle or spindle 10

The invention has been described with reference to a preferred embodiment. Obviously, modifications and alterations will occur to others upon a reading and understand of this specification. It is intended to include all such modifications and alterations insofar as they come within the scope of the appended claims or the equivalents thereof.

Having thus described the invention, it is now claimed:

1. A wheel assembly for a vacuum cleaner, said wheel assembly comprising:

an axle, said axle being generally cylindrical and having an axial centerline, an inward end, and an outward end, said inward end being fixedly attached to said vacuum cleaner, said outward end having a locking projection extending generally radially outwardly from said axial centerline, said locking projection having a locking surface, said locking surface lying in a plane which is substantially perpendicular to said axial centerline;

a collar, said collar being generally cylindrical and having a collar bore therethrough, said collar also having inward and outward ends, said inward end comprising a collar flange; and, a wheel, said wheel having a wheel bore extending therethrough, said wheel also having inward and outward surfaces;

when assembled, said axle fitting concentrically within said collar bore and said collar fitting concentrically within said wheel bore, said locking surface of said locking projection fitting over said outward end of said collar and said outward surface of said wheel and extending radially beyond the collar bore and wheel bore to secure said wheel assembly together.

2. The wheel assembly of claim 1 wherein said outward end of said axle comprises a plurality of spaced locking projections.

3. The wheel assembly of claim 1 wherein said axle is resiliently deformable so that said locking projection can be biased inwardly toward said axle centerline upon insertion of said axle into said wheel.

4. The wheel assembly of claim 1 wherein said outward end of said collar further comprises:

a collar gap, said collar gap receiving said locking projection, thereby preventing rotation of said collar relative to said axle.

5. The wheel assembly of claim 1 wherein said collar is longitudinally split, thereby creating two halves.

6. The wheel assembly of claim 5 further comprising:

a collar gap, said collar gap receiving said locking projection thereby preventing rotation of said collar relative to said axle, wherein said longitudinal collar split is coincident with said collar gap.

7. The wheel assembly of claim 1 wherein said collar flange has inward and outward surfaces and a radial outward edge, said outward surface of said collar flange having a collar canal extending about a circumference of said collar flange near said radial outward edge of said collar.

8. The wheel assembly of claim 1 wherein said axle further comprises:

a slot extending from said outward end toward said inward end of said axle parallel to said axial centerline.

9. The wheel assembly of claim 1 wherein said wheel further comprises:

a recessed wheel annulus adjacent said wheel bore, said wheel annulus extending inwardly toward said inward surface parallel to said axial centerline a distance less than a thickness of said wheel, said wheel annulus creating a wheel ledge lying in a plane substantially perpendicular to said axial centerline, said locking projection fitting over said wheel ledge to secure said wheel assembly together.

10. The wheel assembly of claim 1 wherein said wheel further comprises:

a wheel sleeve, said wheel sleeve lying adjacent and concentrically outwardly of said wheel bore; wherein said inward surface of said wheel is generally concave and is reinforced by a plurality of ribs, said ribs being planar and extending radially outwardly from said wheel sleeve to an outer edge of said inward surface.

11. The wheel assembly of claim 1 wherein said wheel further comprises:

a wheel sleeve, said wheel sleeve being generally cylindrical and lying adjacent and concentrically outwardly of said wheel bore; and, a wheel ring, said wheel ring extending axially inwardly from an inward surface of said wheel, said wheel ring being located concentrically radially outwardly of said wheel sleeve, said wheel sleeve and said wheel ring forming a wheel canal therebetween.

12. The wheel assembly of claim 11 wherein:

said inward surface of said wheel is generally concave and is reinforced by a plurality of ribs, said ribs being planar and extending radially outwardly from said wheel ring to an outer edge of said inward surface.

13. The wheel assembly of claim 12 further comprising:

sealing means, said sealing means being received within said wheel canal.

* * * * *